United States Patent
Goldsworthy et al.

(10) Patent No.: US 6,714,670 B1
(45) Date of Patent: Mar. 30, 2004

(54) METHODS AND APPARATUSES TO DETERMINE THE STATE OF ELEMENTS

(75) Inventors: Kirk F. Goldsworthy, Tewksbury, MA (US); David Y. Li, West Roxbury, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/314,820

(22) Filed: May 19, 1999

Related U.S. Application Data

(60) Provisional application No. 60/086,359, filed on May 20, 1998.

(51) Int. Cl.$^7$ .................................................. G06K 9/00
(52) U.S. Cl. ........................ 382/149; 348/191; 324/770
(58) Field of Search ................................ 382/141, 149; 348/126, 184, 191; 324/770; 702/82

(56) References Cited

U.S. PATENT DOCUMENTS

| | | | | |
|---|---|---|---|---|
| 4,491,868 A | * | 1/1985 | Berridge, Jr. et al. | 358/139 |
| 4,870,357 A | * | 9/1989 | Young et al. | 324/158 R |
| 5,081,687 A | * | 1/1992 | Henley et al. | 382/8 |
| 5,175,772 A | * | 12/1992 | Kahn et al. | 82/1 |
| 5,204,617 A | * | 4/1993 | Kumagai | 324/158 R |
| 5,216,504 A | * | 6/1993 | Webb et al. | 358/139 |
| 5,293,178 A | * | 3/1994 | Kobayashi | 345/87 |
| 5,465,052 A | * | 11/1995 | Henley | 324/770 |
| 5,504,438 A | * | 4/1996 | Henley | 324/770 |
| 5,548,326 A | | 8/1996 | Michael | 348/87 |
| 5,572,444 A | * | 11/1996 | Lentz et al. | 364/551.01 |
| 5,696,550 A | * | 12/1997 | Aoki et al. | 348/125 |
| 5,717,780 A | * | 2/1998 | Mitsumune et al. | 382/141 |
| 5,734,158 A | * | 3/1998 | Nagashima et al. | 250/225 |
| 5,754,678 A | * | 5/1998 | Hawthorne et al. | 382/149 |
| 5,760,829 A | * | 6/1998 | Sussmeier | 348/187 |
| 5,764,209 A | * | 6/1998 | Hawthorne et al. | 345/87 |
| 5,771,068 A | * | 6/1998 | Sali et al. | 348/92 |
| 5,793,221 A | * | 8/1998 | Aoki | 324/770 |
| 5,901,241 A | | 5/1999 | Koljonen et al. | 382/150 |
| 6,215,895 B1 | * | 4/2001 | Salid et al. | 382/141 |
| 6,219,443 B1 | * | 4/2001 | Lawrence | 382/141 |

OTHER PUBLICATIONS

Vernon, D., Machine Vision, Automated Visual Inspection and Robot Vision, pp. 69–71 (1991).
Foley et al., "Computer Graphics, Principles and Practice", Chapter 11, pp. 478–497 (1990).
Watt et al., "Advanced Animation and Rendering Techniques, Theory and Practice", Chapter 3, pp. 65–110 (1992).
Chapra et al., "Numerical Methods for Engineers", Chapters 10 and 11, pp 286–343 (1985).

\* cited by examiner

*Primary Examiner*—Brian Werner
(74) *Attorney, Agent, or Firm*—Tracy Calabresi

(57) ABSTRACT

A methods and apparatuses are disclosed for determining the state of elements in an image. The elements can be arranged in any regular pattern, such as a matrix of LCD display elements. The state of the elements is determined by extracting a characteristic of the elements, such as intensity, and processing the characteristic to provide comparison criteria, such as a difference value. The comparison criteria are then used to determine the state of the element alone or in combination with other comparisons, such as average intensity comparisons. Several comparisons and variations thereof are disclosed, as well as the preferred ordering and configuration of comparisons for LCD displays. Also disclosed is an embodiment where a model of the elements is generated and used to inspect the elements. Also disclosed is a method to normalize the intensity of any image, which in a preferred embodiment normalizes the intensity of the image of the LCD elements before evaluation, where normalizing the intensity of the image optimally makes the grey values of an element of one color the same throughout the image.

43 Claims, 13 Drawing Sheets

$$\begin{bmatrix} 12 & 60 & 13 & 62 & 11 & 58 & 14 & 70 & 16 \\ 63 & 13 & 58 & 14 & 58 & 11 & 60 & 15 & 56 \\ 11 & 59 & 12 & 60 & 13 & 60 & 11 & 61 & 12 \\ 60 & 12 & 63 & 14 & 57 & 13 & 55 & 13 & 62 \\ 12 & 60 & 13 & 62 & 11 & 58 & 14 & 70 & 16 \\ 63 & 13 & 58 & 14 & 58 & 11 & 60 & 15 & 56 \\ 13 & 60 & 11 & 62 & 13 & 57 & 13 & 60 & 14 \\ 61 & 10 & 62 & 13 & 58 & 14 & 56 & 14 & 61 \\ 11 & 61 & 14 & 61 & 12 & 59 & 13 & 69 & 15 \end{bmatrix}$$

METHODS AND APPARATUSES TO DETERMINE THE STATE OF ELEMENTS

This application claims the benefit of U.S. Provisional Application No. 60/086,359, filed May 20, 1998.

FIELD OF THE INVENTION

This invention relates to machine vision, and particularly to methods and apparatuses for image analysis.

BACKGROUND

Machine vision is often used for inspection, such as inspecting the functioning of various configurations of liquid crystal display ("LCD") elements within displays. Each LCD element has at least two states: on or off. Multiple LCD elements are arranged to create more than one configuration within a display, such as clock displays where the configurations include the numbers zero through nine. Various machine vision algorithms have been applied to inspect LCD displays, including pattern recognition and analysis of image subtraction results.

The pattern-recognition systems generate a template of a LCD configuration and optionally a reference site, such as a set of fiducials. The template, that includes both the LCD configuration and the fiducials, is a specific pattern of grey values in an image. A digital image consists of individual pixels, of various light intensities, having x and y integer coordinates. An image is searched to find a subset of the image that is most similar to the template using one of various search strategies known in the art. A score representing the similarity is produced and used to pass or fail the LCD configuration based on the tolerances provided by a user.

One problem with the pattern-recognition technique as applied to LCD displays is the lack of specificity of the results. The results indicate whether the entire configuration of the template functions, but not whether each LCD element within the configuration is functioning properly.

The image-subtraction technique involves creating a difference image. Again, first a template of a LCD configuration is created. Thereafter, an inspection image is acquired of the LCD elements in the configuration that is being inspected. The inspection image and the template are registered, where registration of a pair of objects shall be defined as orienting a first object with respect to a second object to make all alignment parameters of the first object substantially equal to the corresponding alignment parameters of the second object. For example, a first semiconductor fabrication mask is said to be registered with an overlaying second semiconductor fabrication mask when a pair of fiducial marks of the first mask is located at the same projective position as the corresponding fiducial marks on the second mask. After registration, the inspection image is subtracted from the template to provide the difference image. The non-zero values in the difference image indicate potential errors, which are then analyzed.

There are several problems encountered with analyzing the difference image. One problem is that improper registration of the template to the inspection image creates areas of non-zero intensity in the difference image that appear as potential errors. For example, the boundaries of a feature will appear in the difference image as non-zero values when the template is offset in any direction from the inspection image. Another problem is that areas of non-zero intensity in the difference image can appear large enough to be a fatal defect, which will fail the part, when they are not large enough. For example, if a user specifies a part fails for any defect: more than six pixels in area within a LCD element; a six-pixel error that spans two LCD elements should not fail the part. However, in the difference image a six-pixel error within one LCD element is indistinguishable from a six-pixel error that spans two LCD elements. A further problem is that changes in intensity between the template and the inspection image appear as errors in the difference image even when the inspection image contains no flaws. A still further problem is that if the inspection image contains non-uniform changes in intensity, image subtraction will not work well, if at all. Further still, normal acceptable variations of the elements from part to part may appear as false errors in the difference image even if the variation of the part is within acceptable tolerances. Another cause of potential false error in the difference image is because of features on, or near, the elements. For instance, bubbles in a translucent cover, commonly positioned over the elements, will appear as errors in the difference image. Any of these false errors may indicate the LCD elements are not functioning properly: when the LCD elements are functioning properly. Accordingly, more parts are rejected than necessary. To reduce false errors, the template and the inspection image need to be clean, clear, and have similar intensities. This is often not practical, or it is difficult to achieve.

SUMMARY

The invention provides methods and apparatuses for determining the state of elements in an image. An image of the elements is acquired and generally aligned with the image pixels, where the elements each have a state. An element characteristic, that approximately represents each element, is extracted from each element and processed in conjunction with element characteristics of other elements to provide at least one comparison criteria. A threshold value of the comparison criteria is chosen. The threshold value is then used to determine the state of selected ones of the elements.

The element characteristics are processed by comparing differences and/or similarities among the elements globally, locally, and/or among neighbors, including differences of intensity or texture, for example, such as a difference value, or a gradient of the change in intensity, for example.

The threshold value is chosen from the difference values, the intensity values, or the gradient values, for example, previously provided. In one embodiment, the threshold value separates similar elements from dissimilar elements and/or similar element-neighbor pairs from dissimilar element-neighbor pairs.

A preferred embodiment of the methods and apparatuses of the invention is determining the state of display elements, such as LCD elements. In a preferred embodiment, the state of each LCD element is on or off. The LCD elements neighbor each other and are arranged in a matrix. An image is acquired of the matrix of LCD elements each in their own state. The intensity (element characteristic) of approximately each LCD element is extracted from the image, where the intensity value can incorporate portions of the image outside each LCD element depending upon the degree to which positioning of each LCD element is known. Therefore, the intensity value abstracted is said to approximately represent each LCD element. In a preferred embodiment, before extraction, the LCD element is aligned with the image pixels by an Affine Transformation to minimize any error. Thereafter, the intensities of neighboring LCD elements are processed so as to provide a plurality of comparison criteria, where each of the comparison criteria represent selected pairs of neighboring LCD elements. A threshold value is chosen from the comparison criteria and used to determine which LCD elements in the matrix are on or off, where the state of each element is indicated by evaluating at least one comparison criteria derived from the element and the threshold value.

In further aspects, additional comparisons are used alone, or in conjunction with, comparisons to the threshold value to determine state of each of the elements. Additional comparisons of the similarity of each element to a local and/or global average intensity, texture, or other element characteristic are described.

In further aspects, the elements are inspected. In one embodiment, the elements are inspected by comparing a model of the elements to the image of the elements, where the model contains model elements and the image contains test elements. The model is generated, and it contains model elements in substantially the same pattern as the pattern of the test elements, where each of the model elements has a model state. The test elements are associated with a model state of the correspondingly positioned model element. In one embodiment, the correspondingly positioned model element is the model element having the same position as the test element if the model was aligned to the test image. Lastly, the test state is compared against the model state, where the test state is determined as previously described.

In another embodiment, the model is created using the steps previously described of acquiring the image, aligning the image, extracting the element characteristic, processing the element characteristic, choosing a threshold value of the comparison criteria, and determining the model state using the comparison criteria.

In a further embodiment, after the model is generated, the element characteristic of each test element is extracted as one of the element characteristics of a plurality of positions, where the one chosen most closely represents the model state from among the plurality of positions.

In a still further embodiment, after the model is generated, the threshold value for the test elements is determined using the model state information from the model. More particularly, a first histogram is created that contains the comparison criteria of neighboring test elements that are suppose to have different model states and a second histogram is created that contains comparison criteria of neighboring test elements that are suppose to have the same model state. The magnitude of each bin of the first histogram is added to a score graph also having bins, while the magnitude of each bin of the second histogram is subtracted from the score graph for each possible value of the comparison criteria on the histograms. From the score graph, a threshold value of the comparison criteria is chosen that received the highest score.

In a further embodiment, the image intensity is normalized before extracting the element characteristics, where normalizing the intensity of an image, optimally, equalizes the grey values in an image that represent a single brightness. The normalization of the invention minimizes the effect of extraneous variations in image brightness and contrast, whether the extraneous brightness variations are linear or non-linear brightness changes. An extraneous variation in brightness changes is due to factors other than features of the scene to be images. A linear brightness, change in, intensity is one wherein the grey-level value of each pixel varies uniformly across the entire image, and a non-linear brightness change in intensity is a non-uniform change in intensity across an image, which means the grey-level values in one region may vary more than in other regions (i.e. the grey-level values of a object of one brightness varies from one region to another region).

The normalization of the invention makes the grey values much more equal than the various grey values that represented an object of a single brightness in the image before normalization, although it may not equalize all the grey values representing each brightness. Further, the normalization of the invention brings the desired range of grey values and the actual range of grey values much closer, even though it may not exactly equalize the range of grey values (i.e. contrast) between two images or an image and a user's criteria.

The invention recognizes, among other things, that the positions of the LCD elements are better defined by determining a characteristic for a plurality of possible positions for the LCD elements and choosing the positions having the characteristics closest to the model characteristics, such as intensity value, expected in that position. Defining position more precisely minimizes errors, such as errors caused by boundaries from improper alignment during comparison of the model to the image.

The invention recognizes, among other things, that by processing the element characteristics of neighboring and/or local elements, such as taking differences between neighbors, local threshold values, or local averages, the state of the elements can be determined.

The invention solves several of the problems of the prior art, such as each LCD element can be inspected, boundaries do not appreciably contribute to false errors, and the effect of changes in intensity, local and or global, between the model and the run-time image is minimized.

In further aspects, the invention provides an apparatus in accord with the methods described above. The aforementioned and other aspects of the invention are evident in the drawings and in the description that follows.

BRIEF DESCRIPTION OF THE DRAWINGS

The invention will be more fully understood from the following detailed description, in conjunction with the accompanying figures, wherein.

DETAILED DESCRIPTION OF THE DRAWINGS

The methods and apparatuses determine the state of elements in an image. The method is particularly useful for display inspection. Though this is the form of a preferred embodiment, this embodiment should be considered illustrative, and not restrictive.

Figure 1:
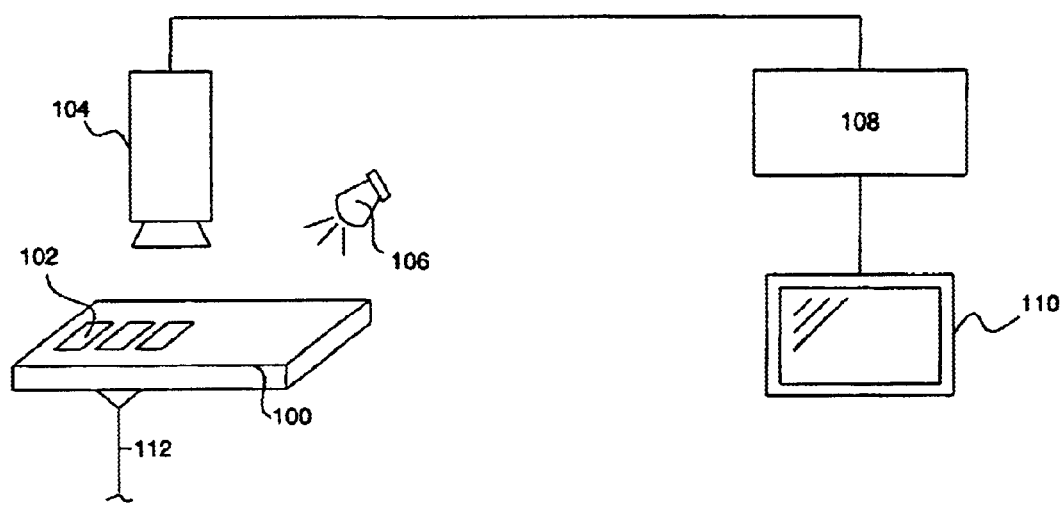
FIG. 1 is a schematic representation of an apparatus of the invention.

FIG. 1 shows a typical system incorporating the present invention (not drawn to scale). The system includes: a movable platform 100, such as a conveyor belt for holding and moving elements 102, such as display panels through a factory line, where the elements are often held in position by a vacuum 112; a video camera 104 or other optical sensing device for generating images representing the elements 102 being analyzed, the video camera 104 being typically positioned over or under the conveyor belt to view the elements 102; an illumination device 106 for illuminating the elements 102; an image processor 108, capable of digitizing and analyzing the optically sensed images; and optionally a monitor 110 to display the images or the results of an inspection, for instance.

In a preferred embodiment, the image processor 108 is implemented on a conventional digital data processing system. Those skilled in the art will appreciate that the image processor 108 may be implemented on a special purpose device constructed in accordance with the teachings herein. The image processor 108 executes the procedures described hereinbelow.

Figure 2:
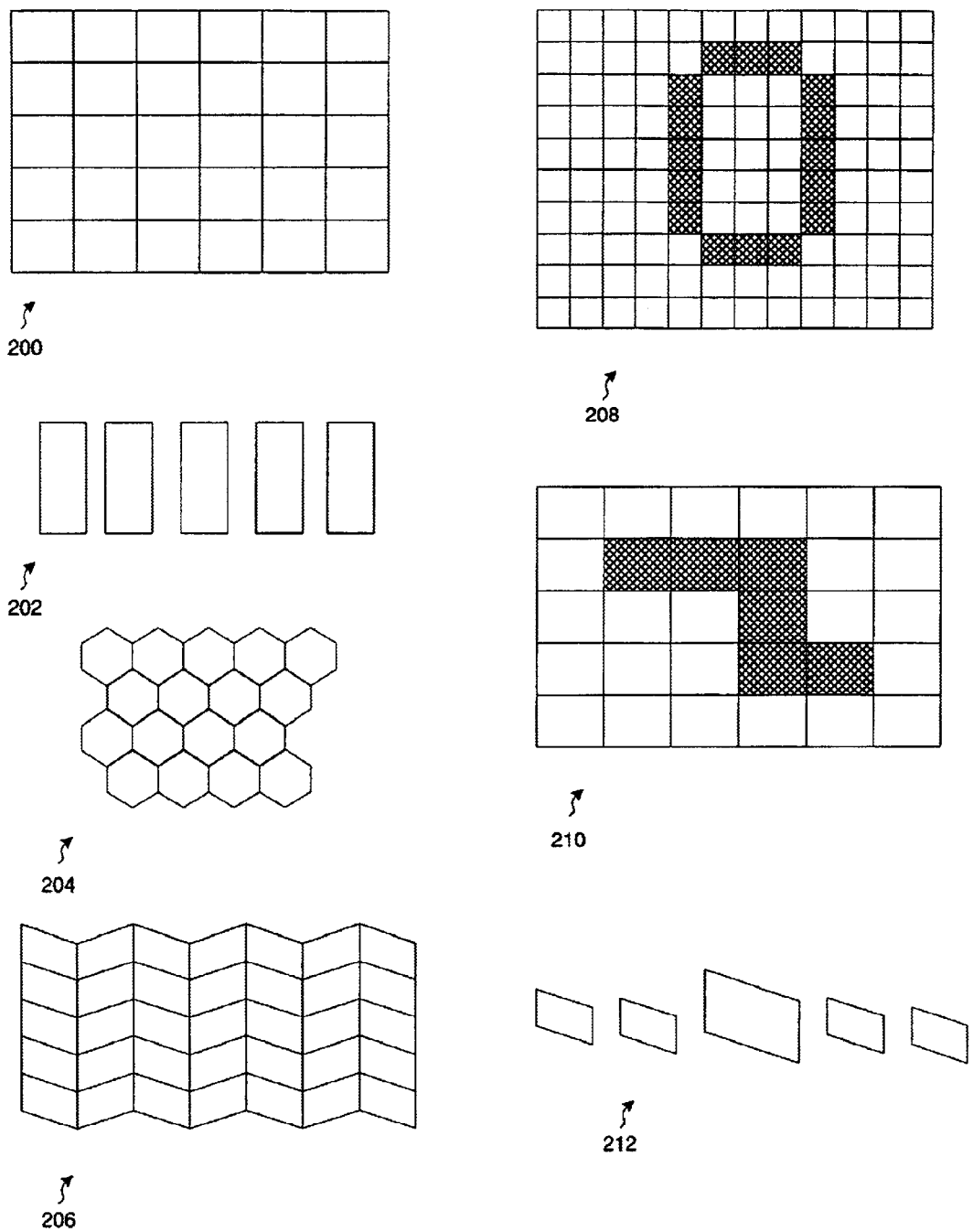
FIG. 2 illustrates a plurality of patterns of elements for which the states of the elements can be determined using an embodiment of the invention. Also shown are a few instances of states of elements within a matrix pattern.
Figure 3:
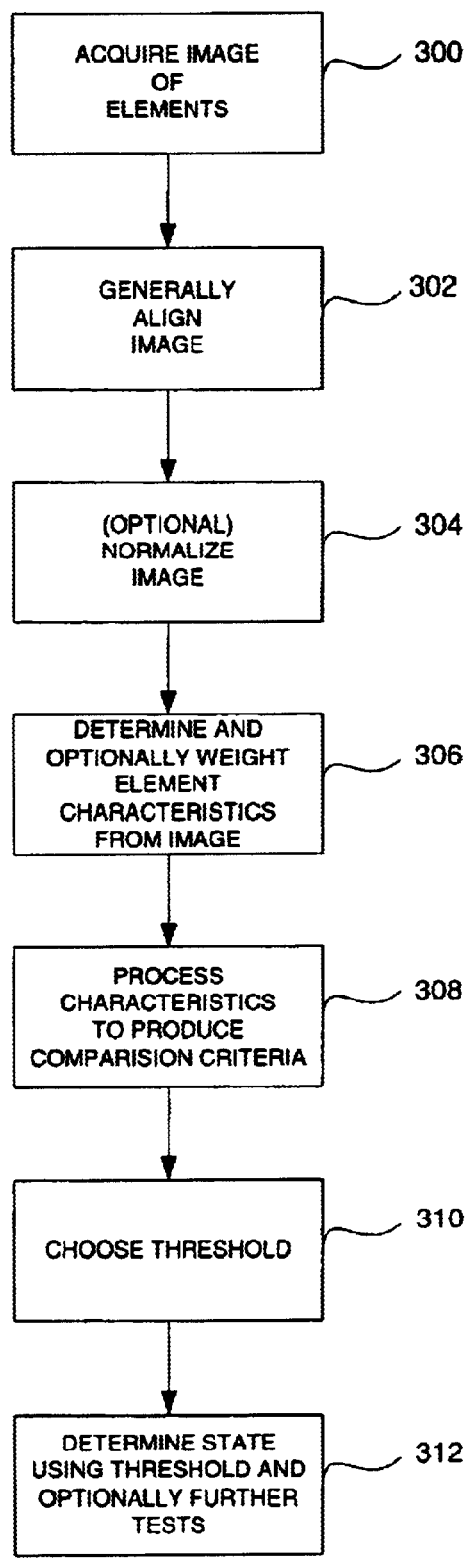
FIG. 3 is a flowchart of embodiments of the method of the invention.

FIG. 3 illustrates a flowchart of a method of the invention, where steps of the method will be denoted in the detailed description in parentheses. The first step is to acquire an image of the elements whose state will be determined (300). Preferably, the elements are arranged in a matrix pattern, such as pattern 200 depicted in FIG. 2. However, the elements can be arranged in patterns other than a matrix, where the pattern is regular and preferably, the elements have neighbors, such as patterns 202, 204, 206, and 212, for example. Also shown are a few instances of elements having off and on states 208 and 210 within a matrix pattern. It should be apparent that the method can evaluate more than binary states, such as high-medium-low states or numerous colors, for example.

The states within any pattern of data that is represented in an image (300) can be processed using the methods and apparatuses of the invention. For instance, the state of each cell of charge coupled devices ("CCD") could be determined using an image representing the screen output of the CCD, i.e. the data of each cell. Also, the state of LCDs or light emitting diodes ("LEDs") can be determined. Further, the method of this invention can evaluate any array of data that is transformed into a pattern and imaged.

Next, the elements are generally aligned with the image pixels (302). To align the elements, first the overall position and orientation of the elements in the image are determined. Preferably, this is accomplished by the user windowing the elements to be examined. The parameters of the window give the overall position and orientation of the elements in the image. Other methods, such as coarse image analysis techniques, known in the art, can also be employed. Once the overall position and orientation are known, an algorithm is applied to "artificially" rotate, and/or translate, and/or scale the region expected to contain the elements. That portion of the image is then processed as hereinafter described. The use of an algorithm is preferable to physically moving and/or rotating the elements. Bilinear interpolation, nearest neighbor interpolation, an Affine transformation, or other techniques, known in the art, can be employed to rotate and/or translate and/or scale the region of the image. In a preferred embodiment, the method uses an enhanced Affine transformation method and apparatus disclosed in, U.S. Pat. No. 6,212,915 entitled, "Image Processing Methods and Apparatus for Separable, General Affine Transformation of an Image", filed Feb. 20, 1998, assigned to Cognex Corporation, and incorporated herein by reference. The resulting image is aligned such that the patterns are generally aligned with the image pixels and preferably, each element occupies an integer number of image pixels.

Next, optionally, to remove some of the effects of a non-uniform light distribution in the image owing to properties other than the brightness of elements, the intensity of the image is normalized (304), using the methods and apparatus described in the U.S Pat. No. 6,577,775, entitled "Methods and Apparatuses for Normalizing an Image," invented by David Li, filed concurrently herewith on May 18, 1999, and commonly assigned to Cognex Corporation. The light distribution is not uniform owing to various factors, including the position of the light, variations in the placement of the element, among others, for example.

Figure 4:
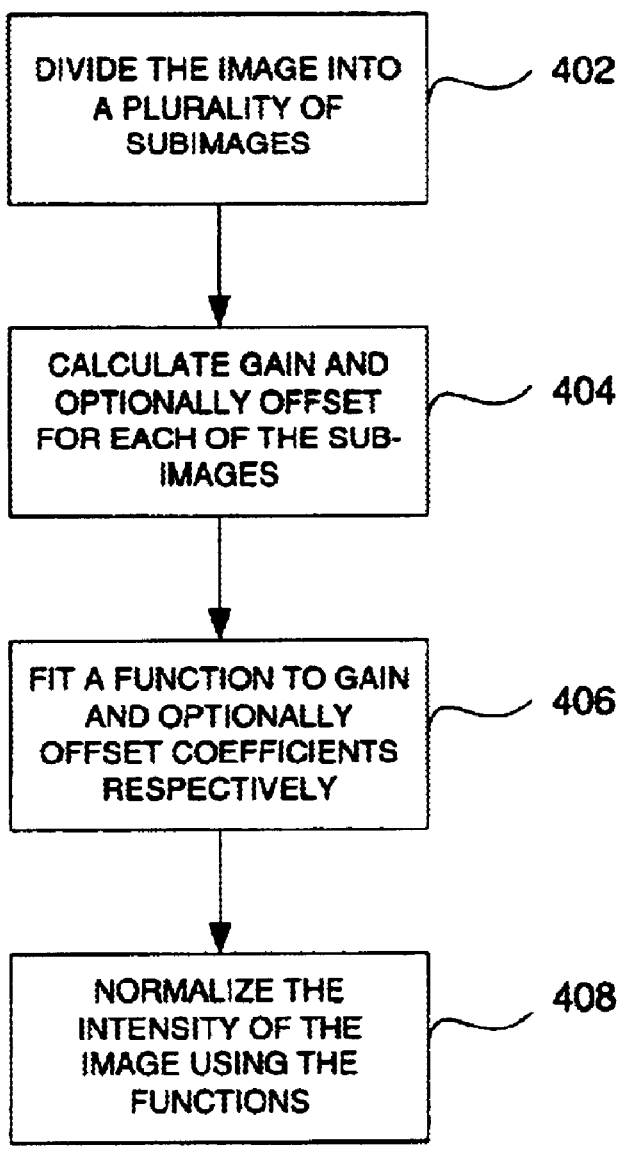
FIG. 4 is a flowchart of one embodiment used to normalize an image of FIG. 3.

Instead of having a gain or offset for the entire image, the normalization generates an individual gain and optionally an individual offset for different portions of the image. The intensities within the image are multiplied by the individual gain coefficients, and offset coefficients are added to the product to produce a normalized image that more accurately represent the feature being imaged by making more equal the grey values representing similar brightnesses in the image (i.e. optimally, equalizing the grey values representing similar brightnesses). The normalization applied in the method of FIG. 3 is described with reference to FIG. 5 and FIG. 4, where steps of the method are denoted in the detailed description in parentheses.

First, the image 500 is divided into a plurality of partitions 502 labeled $P_{M,N}$ (402), also called herein sub-images. Each partition cannot be too small that the intensity data within primarily represents noise, and, therefore, is unreliable. Further, the image should be divided into enough partitions to provide an adequate number of data points for the function fitting (406). The choice of size of the partitions between these two restrictions is application dependent.

Next, the gain $G_{M,N}$ and optionally the offset $O_{M,N}$ of each partition is computed (404). The gain and offset can be calculated in more than one manner.

As known in the art, one image can be normalized to another image, such as a model image, or to within a user's criteria by comparing the means and standard deviations of a grey-level histogram, comparing the entire intensity distribution of histograms, or comparing tails of histograms, for example. A grey-level histogram is a graphical representation of the grey-scale occupancy of an image. The horizontal axis represents grey level and the vertical axis represents the number of pixels. The histogram presents an indication of image contrast and brightness range.

For instance, the user's criteria could be expressed in terms of the right and left tails of a histogram. The left tail is a grey value such that the sum of pixels in the intensity histogram between the absolute minimum grey value (0) and this left tail value is a specified percentage of the total number of pixels in the image. Likewise, the right tail is the grey value such that the sum of the pixels in the intensity histogram between this right tail value and the absolute maximum grey value is a specified percentage of the total number of pixels in the image.

Figure 4A:
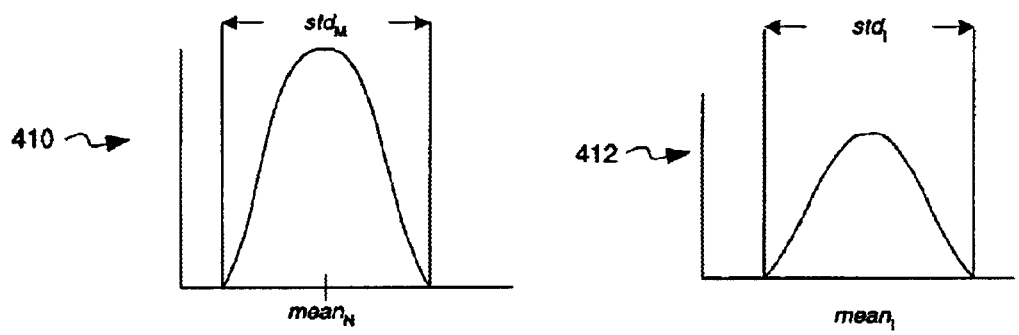
FIG. 4A depicts a grey-level histogram of a partition of a model image and a partition of a test image, respectively.

In one embodiment, illustrated with reference to FIG. 4A, the standard deviations and optionally the means for a model image are used to calculate the gain and optionally the offset of the partitions of the image, as is described hereinafter with reference to FIG. 11.

In a preferred embodiment, only the gain of each partition is calculated using a model-less technique. In this technique, the gain of each partition is the ratio of the mean of a single intensity image to the mean of the partition of a processed image.

The processed image is produced by blurring the image of the elements using a large filter, such as a seventeen-by-seventeen guassian filter, for example.

Preferably, the single intensity image has an intensity equal to the mean of the image before blurring.

Figure 4B:
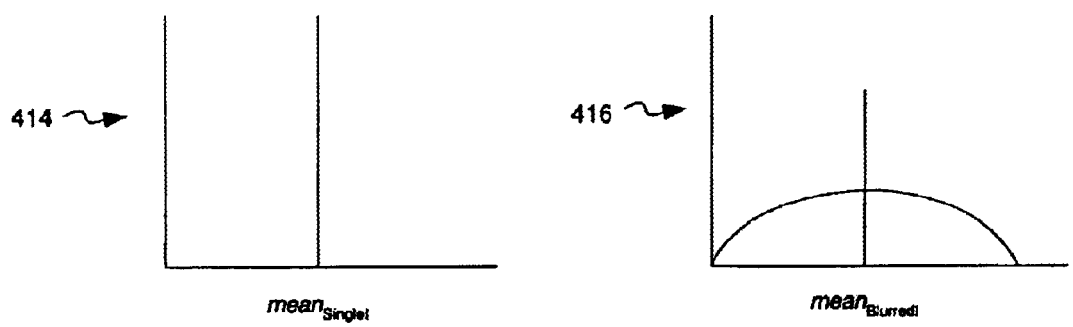
FIG. 4B depicts a grey-level histogram of a single intensity image and a partition of a processed image, respectively.

FIG. 4B depicts a histogram of the single intensity image 414, having a mean, denoted $mean_{SingleI}$, and an instance of a histogram of a single partition of the processed image 416, having a mean, denoted $mean_{BluuredI}$, not drawn to scale. The gain of each of the partitions of the test image is given by:

$$G_{(M,N)} = \frac{mean_{SingleI}}{mean_{BlurredI(M,N)}}$$

Figure 5A:
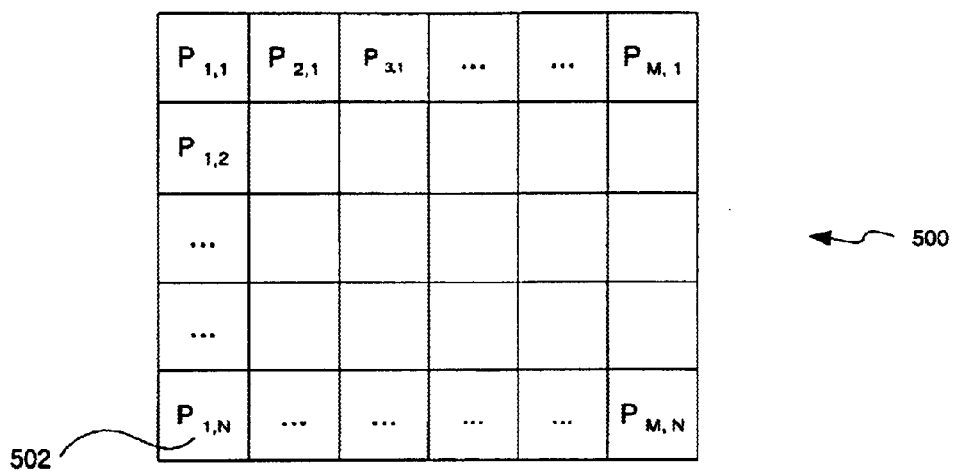
FIGS. 5A–5D illustrate a partitioning scheme used to partition an image into partitions, graphs of the gain and offset of each partition within a row of the image, graphs of the approximate gain and offset of each pixel within a row of the image, and an example of an image before and after normalization using the method of FIG. 4.
Figure 5B:
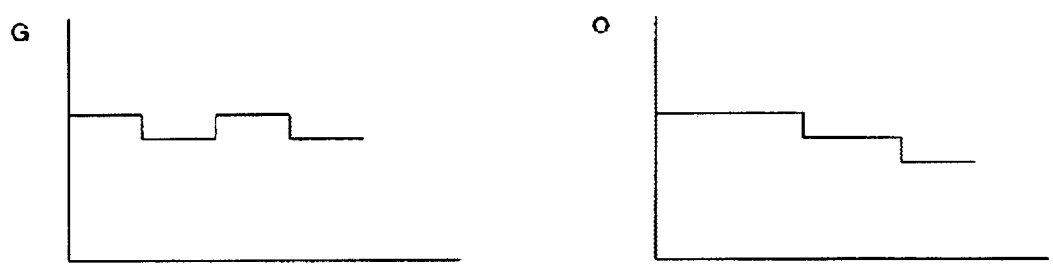

An example of a graph of the gain and offset of the partitions of one row are shown in FIG. 5B, respectively.

When the model-less method is used to normalize the intensity of an image, it is preferred that the image of the elements has a somewhat regular pattern of intensities, so that the intensities within each partition are appropriately represented in the blurred image. The intensity information is too diluted for the technique to work well when the image is blurred too much, such as would be the case when the image is blurred to mask the presence of a large object spanning more than one partition of a single intensity against a backdrop of smaller objects. In this example, the information of the smaller objects may be lost. Optimally, each partition would contain the same number of dark and light pixels, such as a model checkerboard pattern. It should be apparent that the intensity pattern can vary greatly from the checkerboard pattern and still have the intensities normalized using the model-less method.

Next, a function G' (x, y) is fit to the gain coefficients $G_{M,N}$ for the partitions and optionally a function O' (x, y) is fit to the offset coefficients $O_{M,N}$ (406) such that each position within the image has its own individualized gain and offset. Fitting a function to a set of data points such as $G_{M,N}$ and $O_{M,N}$ is a technique well known in the art. The function can be fit using regression, spline fits or other methods known in the art, see, for example, *Machine Vision, Automated visual Inspection and Robot Vision*, David Vernon, 1991, pp. 69–71, incorporated herein by reference, *Computer Graphics, Principles and Practice*, Foley, et al., Chapter 11, pp. 478–497, 1990, incorporated herein by reference, *Advanced Animation and Rendering Techniques, Theory and Practice*, Alan Watt and Mark Watt, Chapter 3, pp. 65–110, 1992, and *Numerical Methods for Engineers*, Steven C. Chapra and Raymond P. Canale, 1985, Chapter 10 and 11, pp. 286–343.

Figure 5C:
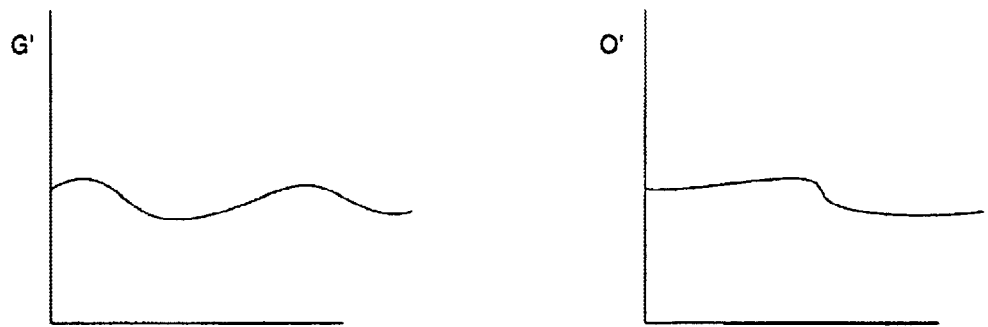

Fitting the data using a polynomial regression is preferred because regression does not give undue weight to single data points that may be erroneous. An example of a graph of G' (x, y) and O' (x, y) for the partitions of one row are shown in FIG. 5C, respectively.

Thereafter, the intensity of the image is normalized (408) by multiplying the gain for each pixel times the intensity of the image at each position and adding the offset for each pixel in the image so as to generate a normalized image I' (x, y), where the operation is given by the formula:

$$I'(x, y)=I(x, y) \times G'(x, y)+O'(x, y)$$

If the offset for each pixel is not calculated, a constant offset coefficient is substituted for O' (x, y) in the above equation.

Figure 5D:
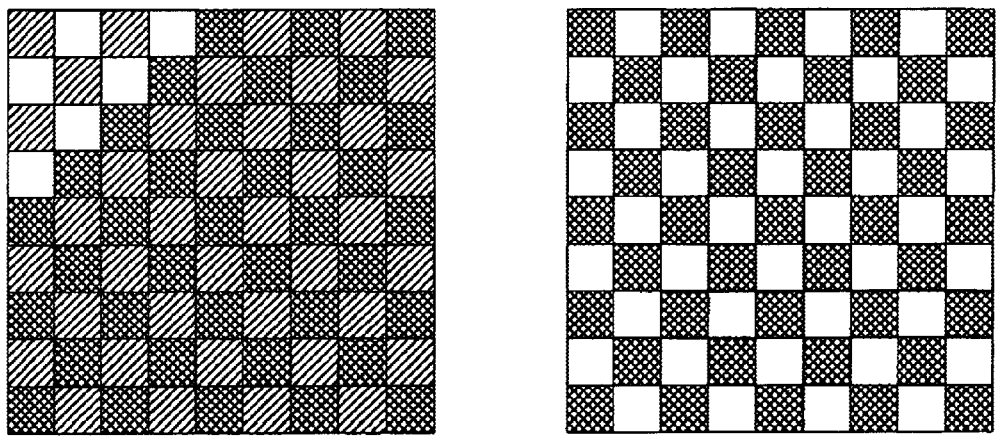

An example of a checkerboard image before and after normalization is shown in FIG. 5D.

Although the normalization was described with reference to a checkerboard pattern of intensities, it should be apparent that the normalization can be applied to any image. Further, using the model-less embodiment that blurs the image, the normalization can be completed prior to alignment, if desired. Further, it should be apparent that gain and/or offset functions can be fitted across portions or an entire image.

In the next step, the intensity of the element within the image is determined (306), as can be described with reference to FIG. 6, with continuing reference to FIG. 3. The intensity is the average of the intensities of the image pixels, or portions thereof, within each element. The position of the element is determined as described hereinbefore, and the size and shape of the elements is given by, or derived from, user input, such as the number of elements, width, and height of the matrix, optical system configuration, or from vision tools known in the art, such as the BLOB Tool, an application of connectivity analysis sold by Cognex Corporation.

Figures 6A, 6B:
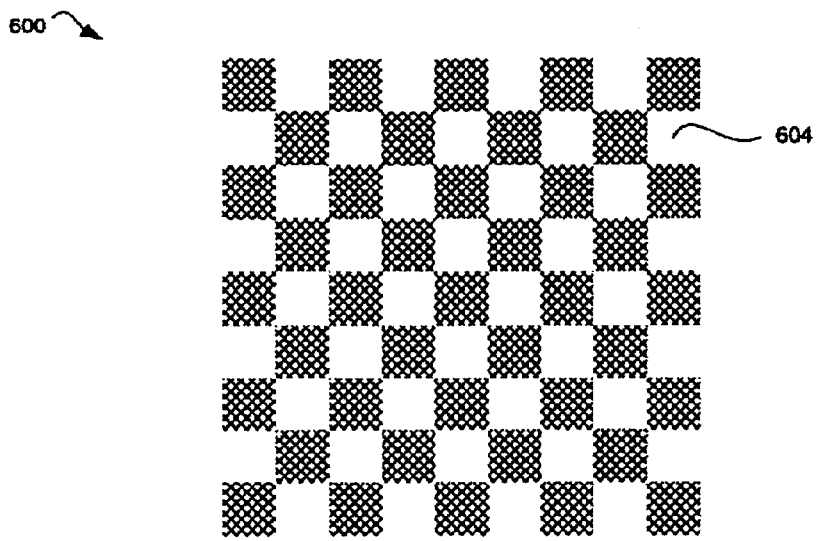
FIG. 6A is a representation of an image of a matrix of LCD elements having neighbors in alternating states.
FIG. 6B is a representation of an instance of the intensities of each of the elements represented in the matrix.

FIG. 6 shows a representation of an image of LCD elements 604 in a matrix 600, where each LCD element 604 $E_{i,j}$ has neighbors in both light and dark states. Also shown is an instance of the average intensities of each of the LCD elements 604, where the average intensities 606 are represented in matrix 602. Optimally, the alignment step (302)

aligned and scaled the LCD elements 604 in the image so that determining the intensity value of each of the elements 604 does not require interpolation, which adjusts for elements that are not aligned with the image pixels and/or not sized to include a whole number of image pixels. In practice, the average intensity value of each LCD element 606 incorporates portions of the image outside each LCD element 604 or fails to incorporate portions of each LCD element 604. Therefore, the intensity value of each LCD element 606 abstracted is said to approximately represent each LCD element 604.

To minimize the effect of other portions of the image from being incorporated into the intensity of each of the LCD elements 606, optionally each LCD element 604 is weighted with a kernel before abstracting the intensity. The kernel corrects, in part, for non-global misalignment. Non-global misalignment is typically caused by optical distortion and is not constant across the image. The kernel will minimize the effect of smaller misalignments, but will further aggravate intensity readings of more grossly misaligned images.

Figure 7:
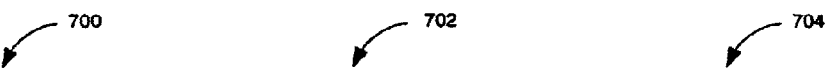
FIG. 7 illustrates three instances of a five-by-five weighting kernel used in the method of FIG. 3.

An example of three such kernels are shown in FIG. 7. The kernels 700, 702, 704 are five-by-five pixels, and, thus are for use on a LCD element that spans five-by-five image pixels in an image. All the kernels 700, 702, 704 discount the sides of the elements by having higher weights at the center of the kernel than the sides. The sides are weighted one in kernel 700, zero in kernel 702, and both one and zero in kernel 704. The larger the kernel, the less impact the choice of the weights has on the resulting values in the intensity matrix because the fraction of the image that is weighted a value other than one becomes smaller and smaller as the kernel size becomes larger. The kernel is applied over the image being centered upon each LCD element 604, as known in the art, resulting in the intensity matrix, such as matrix 602, for example. Whether the kernel is useful depends upon the application.

It should be apparent to those skilled in the art that element characteristics other than intensity can be extracted from the image and used throughout the tests, such as number of edge pixels within an element, a score of the texture of an element, and the homogenous nature of an element, for example. Further, each characteristic can be the average of the element characteristic, particularly when elements are not equally sized, the distribution across the element, or other known representation, before or after weighting.

Thereafter, the intensity values are processed (308) to provide comparison criteria. The values can be processed for differences and/or similarities among the LCD elements globally, locally, and/or among neighbors generating the extent of differences, herein called difference values, a gradient of change, or averages, for example.

Figure 8A:
FIG. 8A illustrates a LCD element and eight of its neighbors.

For instance, the difference between an intensity of an element from at least one of its neighbors may indicate whether the element is dark or light (i.e. on or off as illustrated with reference to FIG. 8A and Table 1. FIG. 8A illustrates an element and its neighbors in a three-by-three neighborhood 800. The element, designated by $E_{0,0}$, has neighbors 802, designated by $N_1$–$N_8$. Table 1 illustrates all cases of differences in intensity between neighbors and elements for an ideal matrix. An ideal matrix of black and white LCD elements represents dark by a grey scale of 0 (i.e. on) and represents light by a grey scale of 255 (i.e. off).

TABLE 1

|  | Neighbor Intensity Value (N) | Element Intensity Value (E) | Neighbor minus Element (N − E) Difference Value |
|---|---|---|---|
| Case A | 255 | 255 | 0 |
| Case B (minimum) | 0 | 255 | −255 |
| Case C (maximum) | 255 | 0 | 255 |
| Case D | 0 | 0 | 0 |

Table 1 demonstrates that the element is most likely light, if the difference value (Neighbor minus Element) is at or near −255, while the element is most likely dark, if the difference value is at or near 255.

Figure 9A:
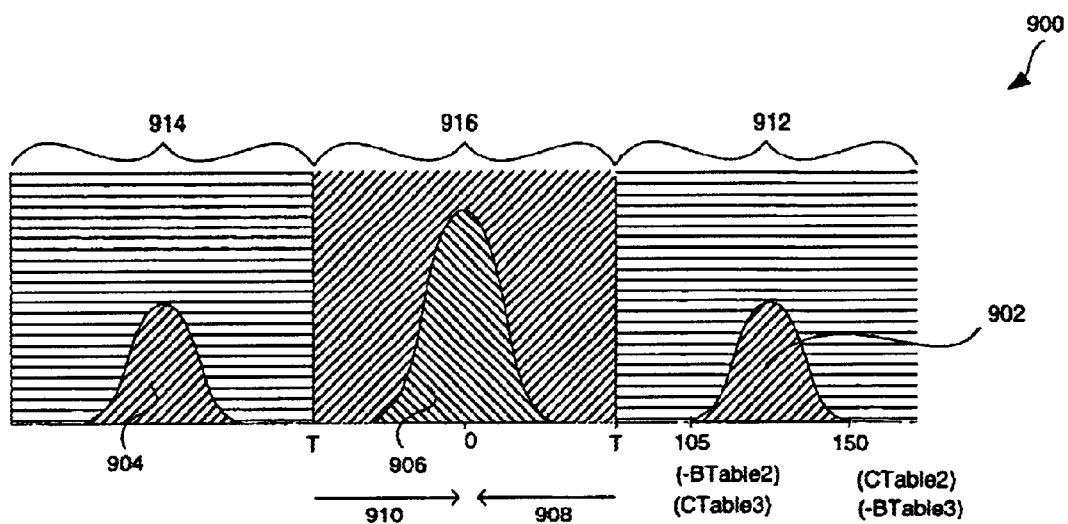
FIG. 9A illustrates a histogram of the differences between multiple LCD elements and their neighbors.

For a non-ideal image, the state of the elements is determined by generating the difference values of the elements and more than one of the neighbors of each element (i.e., difference values of element-neighbor pairs) (308), and conducting a refined version of the test of Table 1. The refined test determines a threshold difference value for the multiple elements (310) and uses the threshold to determine the state (312). First, the difference value is determined for each element and at least one of its neighbors. The difference values are represented on the histogram 900 in FIG. 9A, where the number of difference values are represented on the ordinate and the magnitude of the difference values are represented on the abscissa. The groupings of difference values 902 and 904 in region 912. and 914, respectively, represent element-neighbor pairs that most likely do not share the same state. The grouping 906 in region 916 represents element-neighbor pairs that most likely have the same state because they have a difference value near zero. Techniques known in the art, such as filtering and peak detection are used to refine the histogram 900.

Then, a threshold value, ±T, is chosen (310) from the histogram 900. The threshold value is chosen using one of a number of techniques known in the art, such as the value of the peaks of groupings 906 and 902 or 904 divided by two. If the position of the peaks of groupings 902 and 904 are not equidistant from zero, the average of the absolute values of the two thresholds may be used, for example.

Thereafter, the state is determined by comparing the difference values of each element (i.e. N–$E_{0,0}$ for each $E_{i,j}$) against T (312). The difference values between an element and all eight of its neighbors can be used. However, to save processing time, only a few of the neighbors are tested. In the LCD element application, LCD elements bleed into their neighbors directly above, below, and to the sides, $N_2$, $N_7$, $N_4$, and $N_5$ on FIG. 8A, more than they bleed into their offset neighbors $N_1$, $N_3$, $N_6$, and $N_8$. Therefore, for LCDs, the subset of neighbors processed is $N_2$, $N_7$, $N_4$, and $N_5$ or $N_1$, $N_3$, $N_6$, and $N_8$, but not some neighbors from both groups.

In a preferred embodiment, the difference values between the element and $N_2$, $N_7$, $N_4$, and $N_5$ are generated, and only the minimum difference value and the maximum difference value are compared against ±T.

Referring to the illustration of an ideal case in Table 1, an element that generates the minimum difference value (close to −255, which is case B) is light, and the element that generates the maximum difference value (closest to 255, which is case C) is dark.

As the matrix is typically far from ideal, the difference value is compared against the threshold. If the difference value (N−E) is greater than T, (similar to Case C) the element is dark. If the negated difference value −(N−E) is greater than T, (similar to Case B) the element is light.

The comparison of the elements in this manner classifies elements in regions 912 and 914 to the right and the left of the threshold, respectively. In an ideal checkerboard image, the classification would be complete. Practically, however, some elements remain unclassified.

In an alternate embodiment, to classify elements that were not classified using the original threshold, the difference value is compared to a reduced threshold. Moving the threshold in closer to zero in the direction of 908 or 910 reduces the threshold to a fraction of T.

Further, in an alternate embodiment, the requirement of having the maximum difference value or the minimum difference value indicate the state could be lessened and/or changed. For instance, an element can be classified if one or more of the difference values of the four element-neighbor pairs indicated dark or light against the initial or the reduced threshold value.

Regardless of any relaxing of the tests to determine state, when the intensity of an element is between that of its neighbors, $N_x<E_{i,j}<N_y$, both difference values $-(N_x-E)$ and $(N_y-E)$ are greater than T, creating a contradicting classification of the state of the element. Such an element appears to be like both Case C and Case B, as shown more clearly with reference to Table 2 in conjunction with FIG. 9B and Table 3 in conjunction with FIG. 9C.

TABLE 2

| | Neighbor Intensity Value (N) | Element Intensity Value (E) | Neighbor Minus Element (N − E) Difference Value | For Threshold T = 100 |
|---|---|---|---|---|
| Case $B_{Table\ 2}$ | 0 | 105 | −105 | $-B_{Table\ 2} > T$ 105 > 100 |
| Case $C_{Table\ 2}$ | 225 | 105 | 150 | $C_{Table\ 2} > T$ 150 > 100 |

TABLE 3

| | Neighbor Intensity Value (N) | Element Intensity Value (E) | Neighbor Minus Element (N − E) Difference Value | For Threshold T = 100 |
|---|---|---|---|---|
| Case $B_{Table\ 3}$ | 0 | 150 | −150 | $-B_{Table\ 3} > T$ 150 > 100 |
| Case $C_{Table\ 3}$ | 225 | 150 | 105 | $C_{Table\ 3} > T$ 105 > 100 |

Figure 9B:
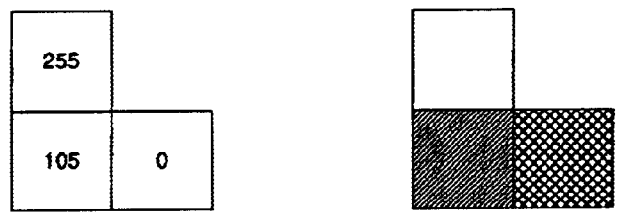
FIGS. 9B and 9C illustrate two instances of a LCD element and a portion of its neighbors.

Table 2 represents an element having an intensity just large enough to trigger the threshold while remaining dark, where the intensity is $N_x<E_{i,j}<N_y$ and $N_x$ and $N_y$ are very dark and bright, respectively. As illustrated graphically on the histogram 900, Case $C_{Table\ 2}$ is farther to the right than Case $-B_{Table\ 2}$. Therefore, Case $C_{Table\ 2}$ is the stronger result, and accordingly, the element is classified as dark, just as in the ideal Case C. An instance of Table 2 is represented in FIG. 9B, which shows three elements having intensities represented numerically and graphically. In an alternate classification scheme, only elements having an intensity satisfying the relation, $N_x<E_{i,j}<N_y$ and having difference values, such as $C_{Table\ 2}$, that are significantly farther to the right on the histogram than Case $-B_{Table\ 2}$ are classified, where the value of significantly is application dependant. The elements having difference values just greater than Case $-B_{Table\ 2}$ are left unclassified. This embodiment leaves elements unclassified when Case $B_{Table\ 2}$ and Case $C_{Table\ 2}$ are approximately equidistant from the origin.

Figure 9C:
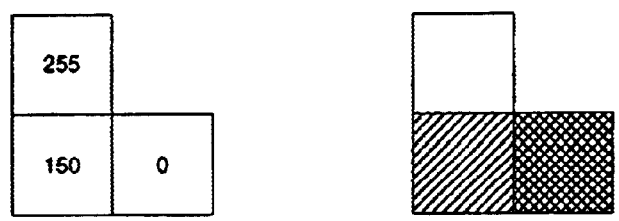

Table 3 corresponds to an element with an intensity just large enough to trigger the threshold while still remaining light. Table 3, as did Table 2, represents an element where the intensity is $N_x<E_{i,j}<N_y$, and $N_x$ and $N_y$ are very dark and bright, respectively. As illustrated graphically on the histogram 900, Case $-B_{Table\ 3}$ is farther to the right than Case $C_{Table\ 3}$. Therefore, Case $B_{Table\ 3}$ is the stronger result, and accordingly, the element is classified as light, just as the ideal Case B was classified. An instance of Table 3 is represented in FIG. 9C, which shows three elements having intensities represented numerically and graphically. In an alternate classification scheme, only elements having $N_x<E_{i,j}<N_y$ and difference values, such as $B_{Table\ 3}$, that are significantly farther to the right on the histogram than Case $C_{Table\ 3}$ are classified, where the value of significantly is application dependant. The elements having negated difference values just greater than Case $C_{Table\ 3}$ are left unclassified. This embodiment leaves elements unclassified when Case $B_{Table\ 3}$ and Case $C_{Table\ 3}$ are approximately equidistant from the origin.

It should be apparent that although differences in intensity of all the elements among their neighbors was described, gradient change of intensity across the elements, or another measure of intensity differences could be used with a threshold value of such differences. Further, differences in other characteristics such as texture, described by a value and/or gradient, can also be used without departing from the scope of the invention.

Moreover, threshold values of local neighborhoods can be used alone or in conjunction with the threshold value previously described. For instance, the majority of the elements can be classified using a global threshold, while the remaining elements are classified using a local threshold in place of or in addition to relaxing the threshold or the degree of distance between the difference values for example. Local thresholds are useful, but have to be recalculated. If computational time is restricted, local thresholds are often advantages only for areas that remain undetermined after a more global analysis.

Figure 10:
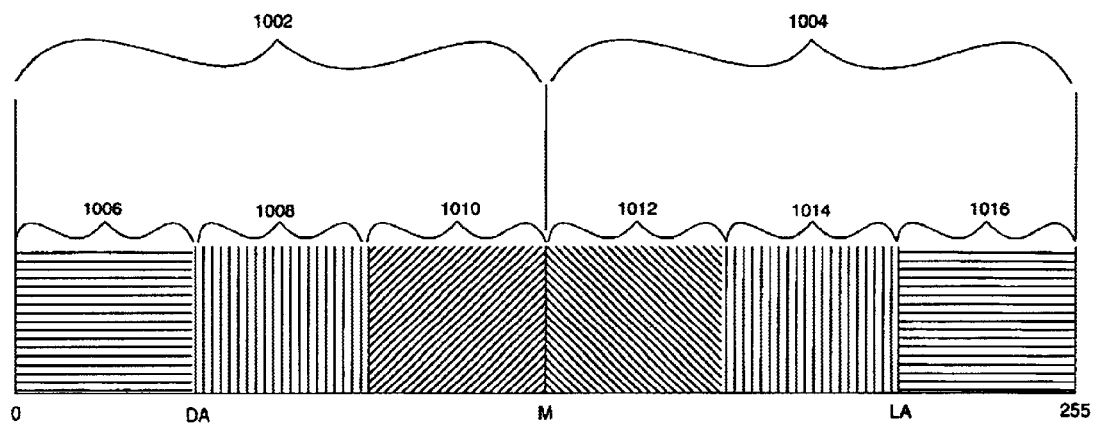
FIG. 10 illustrates a range of possible intensities of LCD elements in an image, where the intensities are divided into regions.

Optionally, any of the foregoing can be combined with other comparisons (312), such as comparison of the average intensity of elements, as is further described with reference to FIG. 10, with continuing reference to FIG. 3. Average intensity is used to verify or alter the initial classification of elements or classify the remaining elements.

First, an average intensity value is found for each state, where only elements that have been classified contribute to the average. Unclassified elements are not counted.

Next, the quality of the data contributing to the averages is assessed. The quality assessment of data determines, in part, whether the average intensity comparisons are used. If there is a small difference between the average light intensity and the average dark intensity or if only a small number of elements are used to generate the averages, the averages are considered less reliable. Based on the quality of the data, average intensity comparisons can be skipped or, alternatively, used only to classify remaining unknowns and/or to alter the initial classification of elements.

During the comparison, either the intensity of a single element or the unknown average intensity of the unknown elements is compared against the averages. A dark average, denoted DA, and a light average, denoted LA, are shown on FIG. 10, where FIG. 10 illustrates a range of possible intensities of LCD elements in an image, where the intensities are divided into regions. The element or group of elements are classified light or dark if the intensity or average intensity, respectively, is significantly closer to the light average or the dark average, respectively, where the value of significantly is application dependant. For example, an element is classified as dark when it has an intensity value within region 1006, which is bounded by zero and the dark average. An element is classified as light when it has an intensity value within region 1016, which is bounded by the light average and 255. Lastly, elements having intensity values within regions 1008, 1010, 1012, and 1014 are left unclassified and/or unchanged.

Depending on the assessment of the data, the application, and the user's options, there are many variations of classification schema possible. For instance, "significantly" can exclude or include regions towards the midpoint, denoted M, such as regions 1008 and 1014. Similarly, the intensity classification can alter a previous classification when the element falls within some regions but not within others. For instance, the intensity comparison can alter classification of elements having intensities in regions 1016 and 1006, the most extreme intensity values, while leaving unclassified elements having values that fall in other regions or changing to unclassified (when the intensity comparison contradicts the previous classification), elements having values that fall in the other regions. Alternatively, only elements that received the same classification from the intensity comparison and the difference comparison(s) are classified and all other elements remain or become unclassified. It should be apparent that whether the intensity comparison verifies or alters any previous classification depends on the application.

It should be apparent that the regions do not have to be defined equidistant from the midpoint to the dark average and light average, respectively.

In one embodiment, to ensure that all the unknown elements are classified by the intensity comparison test, the "significantly" requirement is eliminated. In this embodiment, every element or group is classified as dark if the intensity or average intensity, respectively, is within region 1002, which is bounded by zero and the midpoint, and classified as light if the intensity is within the region 1004, which is bounded by the midpoint and 255.

The unclassified elements, whether remaining or created by the intensity comparison, are classified by relaxing the requirements for the difference value comparison and/or the intensity comparison, as previously described, using local comparisons, and/or combining them to produce a final classification. Local comparisons would include using an average from local neighborhoods as opposed to or in conjunction with the global intensity averages and/or local and/or global threshold values, previously described.

It should be apparent that the order of the difference and intensity comparisons can be interchanged, even though it is preferred that the intensity comparisons be performed after comparing the differences in order to use the information derived in the difference comparisons to assist the intensity comparisons. When the intensity comparisons come first, the classifications completed by the difference comparisons can be of all the elements or restricted to the unknowns, as described with reference to the intensity comparisons. In some applications, such as clean images, the average intensity test alone without difference comparisons may be effective to determine state.

The invention recognizes that comparing global intensities is not well suited to all images. Images having local occlusions are not well suited to global intensity analysis, where a local occlusion is an obstruction of the image in a concentrated area of the image that is small in area compared to the area of the image. The invention recognizes that the local versions of the comparisons are particularly suited to such images. The normalization technique can be applied to such images, however, the order of the polynomial required to fit the gain and optional offset coefficients of the image is too high to be practical using the current technology.

In contrast, images without local occlusions typically benefit from the use of both the global and local intensity comparison alone or in conjunction with the difference value. Such images also benefit from the normalization technique, hereinbefore described, and/or using a local threshold value.

Figure 8B:
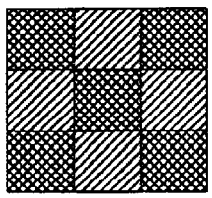
FIG. 8B illustrates an example of black and white LCD elements in a three-by-three neighborhood having alternating states.

In addition to comparing a value against a threshold value or using average intensity, an application specific comparison can be employed to determine state (312). For example, as previously described, LCD elements bleed into neighbors above, below, to the right and to the left. The invention recognizes that the neighbors, even if in a different state than the element, will have an intensity value closer to the opposite state because of the bleeding. FIG. 8B illustrates an example of black and white LCD elements in a three by three neighborhood having alternating states. The intensity values of the neighbors $N_2$, $N_4$, $N_5$, and $N_7$ are light, but have an intensity value closer to the dark intensity value because of the bleeding effect. The threshold value from the difference comparison is reduced significantly, such as by more an one-half, prior to classification, to quickly classify neighbors exhibiting this known effect. The opposite is true for most colored LCD, light LCDs are on and bleed into its dark neighbors. Therefore, neighbors exhibiting lighter intensities can be quickly classified as dark using a similarly reduced threshold. The application specific test can be used to verify or declassify previously classified elements in addition to classifying unknown elements as was previously described with respect to average intensity comparisons.

It should be apparent that images with less noise can be classified using the more stringent test and less of them, while nosier images require more specific test, such as localized comparisons. Further, images with more noise benefit from the checkerboard pattern which provides a plurality of data to work from, and the checkerboard pattern can minimize the number, or degree, of comparisons required before all the elements have a determined state.

Figure 11:
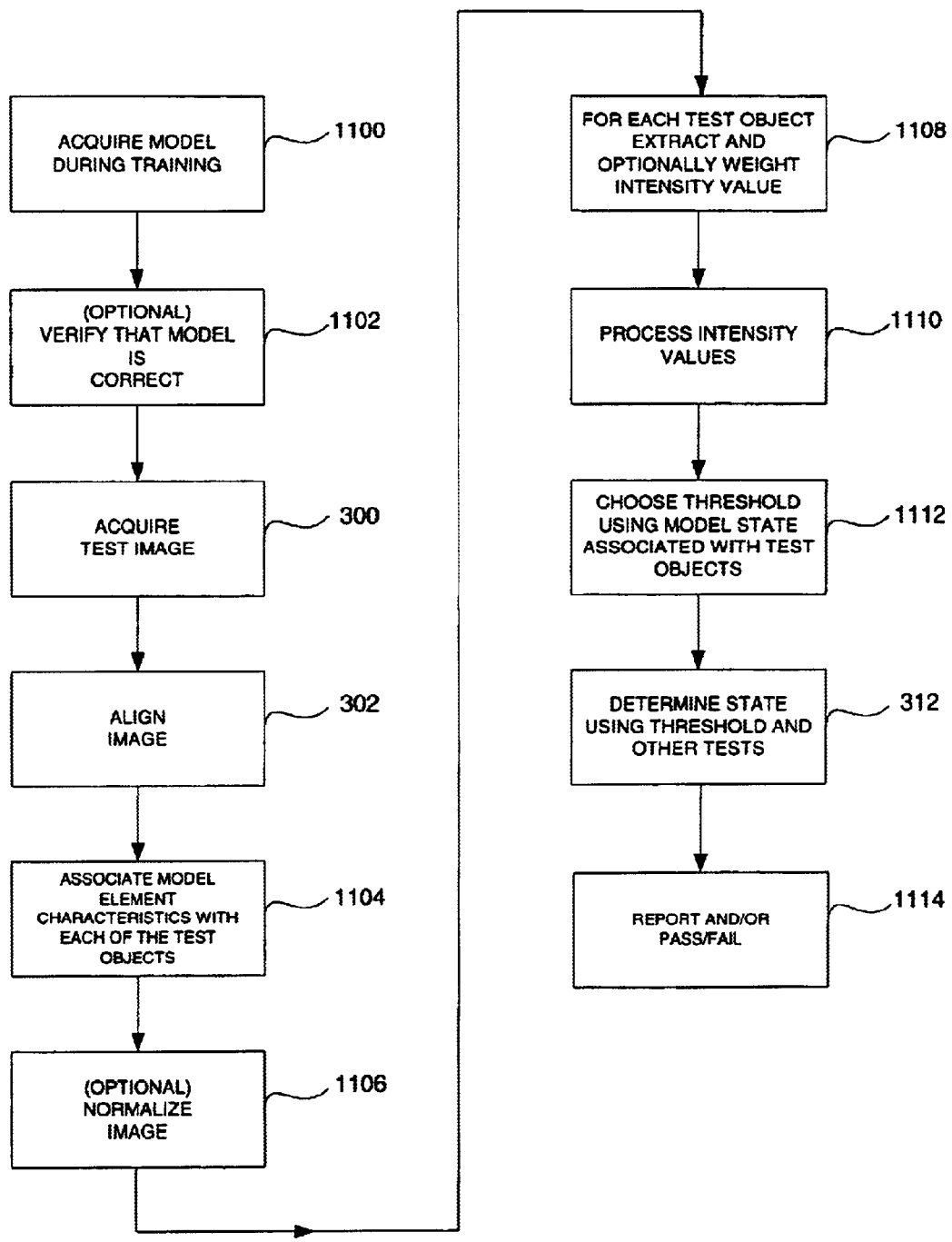
FIG. 11 is a flowchart of a preferred embodiment of the method of the invention.

Turning now to FIG. 11, FIG. 11 illustrates a flow chart of a preferred embodiment of the invention wherein elements are inspected, where the steps of the method will be denoted in the specification in parentheses and wherein like numerals indicate like steps. The elements are inspected by comparing an image of the elements against a model, where the model is generated in the first step (1100). The model contains the pattern of the elements and their states. The pattern and the states can be acquired from data files, user input, or synthesized from a geometric description. Preferably, however, the specifics of the model are determined by acquiring a known good sample of the elements in their states and applying the steps (300)–(312) as described with reference to FIG. 3.

The model is generated "off-line" during training, i.e. prior to any inspection run, and therefore, can use the most time intensive comparisons previously described. For instance, all the neighbors of each element can be examined, not just a subset. Further, a local threshold can be used first, and may perhaps classify many more elements than a global threshold. An image tested with using a local threshold may require fewer additional tests to classify remaining unknown elements and/or verify the initial classification of the elements, but still provide equal or greater accuracy.

Optionally, the accuracy of the model is verified (1102). The model is verified by displaying the model to the user for approval. Alternatively, the model can be verified against a data file description, such as a CAD description, or verified using combinations of other vision techniques known in the art.

The model pattern and the states of the elements within the model are used during run-time to assist in identifying states of the elements and inspecting the elements. For clarity during the remainder of the description of FIG. 11, the elements and states of the model are referred to as model states and model elements, and the elements and states of the test image to be inspected are referred to as test states and test elements.

During run-time, a test image of the test elements is acquired (300) and aligned (302), as previously described.

Then, the characteristic(s) of each model element, such as model state and optionally the mean, standard deviation, and/or tail criteria, for example, are associated with the corresponding test element in the test image (1104). The model characteristics of each model element is associated with a test element having the same position in the pattern as the model element. For instance, model elements, in a one-dimensional array M[j], each have a model state equal to $M_j$ for each position j in the array. A test image of an array of test elements E[k] is associated in consecutive order for each position k with the model state of $M_j$. If the model is an image, the association is completed by substantially aligning the test image to the model stored during training. The initial registration is effected by vision tools known in the art, such as described in U.S. Pat. No. 5,548,326 entitled "Efficient Image Registration" which is incorporated herein by reference.

The test image is optionally normalized (1106). The test image is normalized as previously described with reference to FIGS. 4 and 5, using the model-less embodiment described with respect to FIG. 4B, the model embodiment known in the art or the technique described hereinafter with respect to FIG. 4A. The histogram characteristics, such as means, standard deviations, tails, or distributions of the model calculated during training are used to find the gain coefficients, $G_{M,N}$, and optionally the offset coefficients, $O_{M,N}$, of the test image.

When using a model image or model information to normalize the test image, each partition of the test image and its corresponding test characteristic(s) are associated with each appropriate partition of the model image or model information and its corresponding model characteristics. In one embodiment, the standard deviations and optionally the means of the partitions of model and the test image are used to find the gain and optionally the offset of the partitions of the test image as described with reference to FIG. 4A. FIG. 4A depicts an instance of a histogram of a single partition of a model image 410, having a mean, denoted $mean_m$, and a standard deviation, denoted $std_m$, and an instance of a histogram of a single partition of the test image to be normalized 412, having a mean, denoted $mean_I$, and a standard deviation, denoted $std_I$, not drawn to scale. The gain of each of the partitions of the test image is given by:

$$G_{(M,N)} = \frac{std_{M(M,N)}}{std_{I(M,N)}},$$

and the optional offset of each partition is given by:

$$O_{(M,N)} = mean_{M\ (M,N)} - mean_{I\ (M,N)}.$$

G' (x, y) and optionally O' (x, y) are calculated as previously described, and the intensity of the image is normalized using the equation $$I'(x, y) = I(x, y) \times G'(x, y) + O'(x, y)$$

where I (x, y) is the test image, and I' (x, y) is the normalized image.

Further, as should be apparent, when the model image is used, the blurring and single intensity image are not required.

Figure 12:
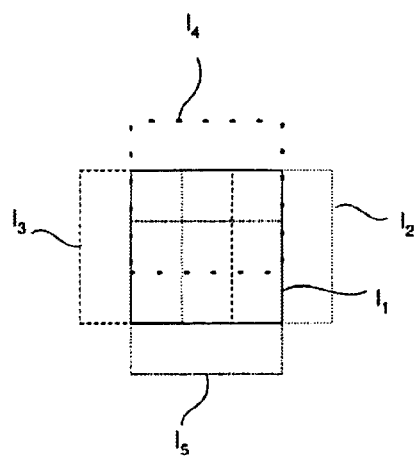
FIG. 12 illustrates five possible locations of an LCD element extracted from an image during a run-time portion of the method of FIG. 11.

Next, the intensity of each test element is abstracted from the test image and optionally weighted (1108). Although the intensity can be abstracted as previously described, preferably, the method determines the weighted intensity of five possible positions for each test element, and uses the intensity of the position most closely indicating the model state associated with the test element. FIG. 12 illustrates five possible positions of a single LCD element extracted from an image, where the positions are labeled I1, I2, I3, I4, and I5. A kernel, such as that shown in FIG. 7, is applied centered at each of the positions I1, I2, I3, I4, and I5 to yield intensity values V1, V2, V3, V4, and V5, respectively. If the model state associated with the test element is dark, the intensity value among V1–V5 that is closest to zero is used for the intensity of that test element.

Checking the different positions, I1–I5, helps compensate for optical distortions, for wobbling of the LCDs, and any remaining misalignment. It should be apparent that more or fewer positions can also be used. In an alternate embodiment, checking multiple positions is replaced by dividing the test image into unequal rows and columns to balance the distortion before extracting the intensity values. The usefulness of either embodiment depends upon the test image.

Next, in a preferred embodiment, intensities are processed by subtracting the intensity values of the test elements from neighbors to generate difference values between neighbors (1110), as previously described.

Thereafter, the threshold is chosen. Again, the threshold can be chosen using the method previously described or by other known techniques in the art. In a preferred embodiment, however, the threshold is chosen using the model state of the test elements given by the model (1112), as is described with reference to FIGS. 13A–13D. Using neighbors $N_1$–$N_4$, one histogram is created containing the difference values of element-neighbor pairs of the test image that the model has having the same state 1302, hereinafter denoted the same-state histogram. A second histogram is created containing the difference values of element-neighbor pairs of the test image that the model has having different states 1304, hereinafter denoted the different-state histogram. The same-state histogram 1302 is added to a score graph 1322, and the different-state histogram 1304 is subtracted from the score graph 1322. The threshold is chosen from the score graph 1322 as the difference value of the bin having the highest score, which is anywhere between A and B. In a preferred embodiment, the value of bin A is chosen as the threshold.

Figure 13A:
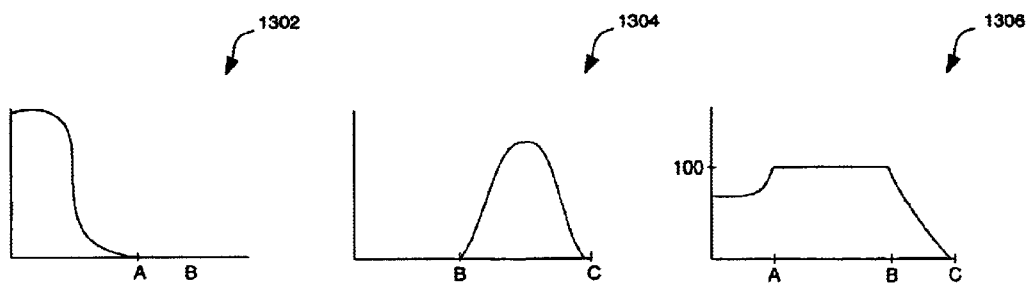
FIGS. 13A–13D each illustrate two histograms of the differences between LCD elements and their neighbors, one of the histograms contains differences of neighbors that are expected to be in the same state and the other histogram contains differences of neighbors that are expected to be in different states. Also shown is a score graph of the two histograms for each FIG., where the score graph is used to find a threshold during a run-time portion of the method of the invention of FIG. 11.
Figure 13B:
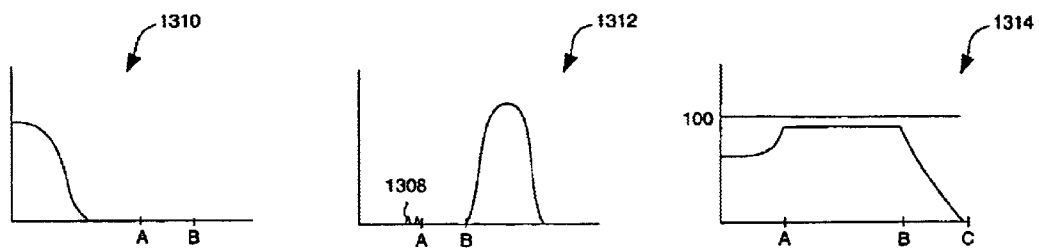
Figure 13C:
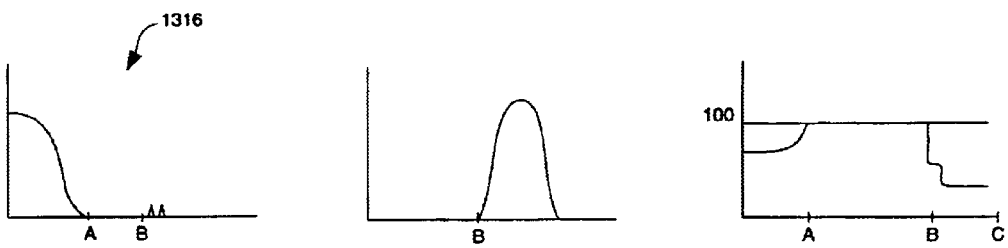
Figure 13D:
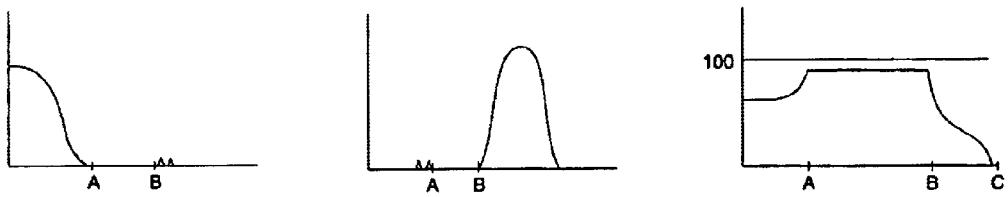

Other examples of same-state histograms and different-state histograms are shown. FIG. 13B illustrates the histograms of a test image having test elements appearing to be in the same state as their neighbors 1308 even though the element-neighbor pair is expected according to the model to be different states and included on the different-state histogram 1312. In this instance, the highest score in the score graph 1314 will be lower than that of FIG. 13A if the bins 1308 are positioned before bin A, but equal to FIG. 13A if the bins 1308 are positioned after bin A (not shown). FIG. 13C illustrates the opposite situation, where a test image has elements appearing to be in different states than their neighbors even though the element neighbor pair is expected according to the model to be in same states indicated by bins 1316. FIG. 13D illustrates the effect on the score of combining FIGS. 13B and 13C.

Although the preferred embodiment uses a threshold value determined from difference values, it should be apparent that the threshold value can be determined using the model information in other ways. For instance, if the model was a checkerboard pattern of ones and zeros, a threshold value determined from intensities could be found using labeled projection, an example of which is described in commonly assigned, U.S. Pat. No. 5,901,241, incorporated herein by reference. Basically, the intensities of the test elements in the test image could be represented in two histograms, where one histogram contained the intensity of all the test elements associated with ones and the second histogram contained the intensity of all the test elements associated with zeros. The threshold could then be found using methods known in the art, such as adding the intensity values of the peaks of the two histograms and dividing by two, for example.

Next, the state is determined as previously described (312). A preferred ordering and combination of the comparisons is as follows:

First, test elements are classified that have maximum difference values above T and minimum difference values below –T (elements described with reference to Tables 2 and 3 and FIGS. 9B and 9C).

Thereafter, test elements having maximum difference values or minimum difference values above T or below –T respectively, but not both, are assigned dark states and light states, respectively.

Next, if the intensity data is considered reliable, all test elements (classified and unclassified) are reexamined in light of an intensity comparison. Unclassified elements are classified dark or light if the intensity of each element is significantly closer to one intensity average than the other intensity average. For classified elements, in a preferred embodiment, intensity, at least initially, may change the classification determined using the difference comparison. If the intensity of an element is not significantly closer to the intensity average (including above and below the average) indicated by the difference comparison, than the element initially becomes unclassified (i.e. when the comparisons contradict each other, the classification of the elements is changed to unclassified). If however, the intensity comparison so strongly indicates that the elements should be classified as one state over another, the element is classified despite the contradicting difference comparison, where the comparison is considered to strongly indicate one state when the intensity of the element is greater than the light average or less than the dark average. If the intensity data is not considered reliable, only unclassified elements are compared to the intensity averages.

From here forward, previously classified elements are not altered, and the tests are relaxed to classify any remaining unknowns. The remaining unknowns can be test elements never classified or test elements that became unclassified after the intensity comparison. First, the unknowns are compared against a reduced difference threshold value. The unknown element is classified if a significant number of the element-neighbors pairs indicate light or dark when compared to the reduced threshold, as described above. The remaining unknowns are classified by relaxing the intensity comparison if the user considered the intensity evaluation to be appropriate and the intensity data was good. The intensity comparison is relaxed to only require that the intensity of the element is significantly closer to the average, which includes above or below the average, instead of requiring that the intensity is greater than the light average or less than the light average. Next, application specific tests are applied. Lastly, if unknowns still remain, local evaluations begin. The first local test is comparisons against local intensity averages, as previously-described. Next, the local intensity average comparisons are combined with further relaxation on "significantly", as previously described, and continuing relaxation on difference threshold value and/or number of neighbor-element pairs needed to classify elements. Any remaining large areas of unclassified elements are looped through the local average intensity comparison, where the comparison requires less and less data for the local averages and continually reduces the extent to which the intensity of an unknown element must be closer to one average as opposed to another.

Lastly, the test state of the test elements is reported to the user, compared to the model, and/or the test element(s) are passed or failed depending upon the user's tolerances (1114), where typically the user inputs the tolerances. In the black/white LCD element example, dark is associated with the on state and light is associated with the off state.

It should be evident to those skilled in the art that that method can use a model for inspection with or/without using the model for extraction (1108), normalization (1104), and/or thresholding (1112). It further should be evident that a model can be used with other variations in comparisons as discussed under FIG. 3 and not only with the preferred embodiment described with respect to FIG. 11.

It should be appreciated with respect to the foregoing, that it is not necessary to acquire model image information before every inspection and that a database of information can be stored and accessed to obtain model image information. The database of information can be from a captured image, downloaded from a Computer Aided Design tool or otherwise acquired.

It should also be evident to those skilled in the art that differences in state other than on—off can be determined using the method of the invention. For instance, the state of elements can be analyzed over a sequence of process steps, such as deposition, to determine when different materials had been applied. Depending upon the requirements of the inspection, the model state and pattern could be continually for each step. Further, it should be evident to those skilled in the art, that one can also perform additional tests in conjunction with those described herein without departing from the scope of the invention.

It should also be apparent to those skilled in the art that comparing differences of characteristics other than intensity of neighboring elements can be used without departing from the scope of the invention, such as statistical representations, for example, of the elements or groupings of elements.

It should be further appreciated by one skilled in the art that the order of the comparisons or of some of the steps, such as alignment and normalization using the model-less embodiment, for example, can be altered without departing from the scope of the invention.

Those skilled in the art will also appreciate that some, or all, of the steps of aligning, normalizing, weighting, processing the criteria, thresholding, and comparing described hereinbefore can be combined and effected as hardware implementations, software implementations or a combination thereof, and that the invention can be implemented on a specialized vision system or other platforms, such as general purpose computers running software and/or configured with hardware to effect the functionality described herein.

Additionally, while operations described herein use the run-time image and model image, it should be appreciated that any of the images described herein can be subject to further processing, such as by filtering using a gaussian filter, median filter, smoothing filter, morphological filter or the like known in,the art, in order to improve image quality.

Although a preferred embodiment principally described that element characteristics were extracted as intensity data from the image, the invention is not limited to such a representation of data. Data representing the first-state image can be represented in other ways, such as a series of data points, for example.

Those skilled in the art will also realize that using reduced-resolution images to generate the gain or offset coefficients and/or extract the element characteristics, for example, could decrease processing time. Further any combination of full-resolution and reduced-resolution images can be used. However, use of reduced-resolution images typically results in a loss of accuracy.

Those skilled in the art will realize that processing time can also be decreased by performing any of the computations described herein using sampled data, such as generating best-fit equations from sampled data, determining statistical element characteristics from sampled data, generating comparison criteria from sampled data, generating histograms from sampled data, generating scores using sampled data, comparison testing of sampled neighbor-element pairs, or generating intensity averages from sampled data, for example. Sampled data is a subset of the available data points, such as every third data point, for instance.

Although the invention has been shown and described with respect to exemplary embodiments thereof, various other changes, omissions and additions in the form and detail thereof may be made therein without departing from the spirit and scope of the invention. Other modifications and implementations will occur to those skilled in the art without departing from the spirit and the scope of the invention as claimed. Accordingly, the above description is not intended to limit the invention except as indicated in the following claims.

What is claimed is:

1. A method for determining a state of test elements, the method comprising:
   acquiring a test image of the test elements, each of the test elements being in a test state;
   extracting a test element characteristic for each test element of the plurality of test elements, wherein the test element characteristic at least approximately represents each of the test elements in the test image;
   processing the plurality of test element characteristics from the test image alone so as to provide a plurality of first comparison criteria;
   choosing at least one threshold value based on at least a subset of the plurality of first comparison criteria and comparing at the least one threshold value with at least one of the plurality of the first comparison criteria to provide one or more comparison results for each one of the test elements associated with the at least one of the plurality of comparison criteria; and
   determining the test state of selected ones of the test elements in the image using the respective one or more comparison results so as to provide known-state test elements.

2. The method of claim 1, further comprising:
   aligning generally the test elements with image pixels before extracting the element characteristic.

3. The method of claim 1, wherein the test elements are display pixels, and the test state is one of on and off.

4. The method of claim 1, wherein the test elements are arranged in a regular pattern.

5. The method of claim 4, wherein the regular pattern is a matrix of squares.

6. The method of claim 5, wherein the test elements are display elements disposed approximately within each of the squares.

7. The method of claim 1, wherein the test element characteristic is indicative of the test state.

8. The method of claim 1, wherein the test element characteristic is intensity.

9. The method of claim 1, wherein the test element characteristic is texture.

10. The method of claim 1, wherein the plurality of first comparison criteria are comparison criteria of selected pairs of neighboring test elements.

11. The method of claim 1, wherein processing the plurality of test element characteristics, includes:
    subtracting the test element characteristics of at least one neighboring test element from the test element characteristic of each of the test elements so as to provide at least one first comparison criteria for each selected neighbor pair of the test elements.

12. The method of claim 1, wherein processing the plurality of test element characteristics, includes:
    determining a gradient between the test element characteristics of at least one neighboring test element from each of the test elements so as to provide the plurality of first comparison criteria.

13. The method of claim 1, wherein processing the plurality of test element characteristics, includes:
    comparing similarities between the test element characteristics of at least one neighboring test element from each of the test elements so as to provide the plurality of first comparison criteria.

14. The method of claim 1, wherein processing the plurality of test element characteristics, includes:
    comparing differences between the test element characteristics of at least one neighboring test element from each of the test elements so as to provide the plurality of first comparison criteria.

15. The method of claim 1, wherein the at least one threshold value approximately separates the plurality of first comparison criteria.

16. The method of claim 1, wherein the subset is comparison criterias of local neighborhoods of the test elements.

17. The method of claim 1, wherein determining the test state includes:
    comparing the at least one threshold value against the at least one first comparison criteria of selected ones of the test elements to indicate the test state of the selected ones of the test elements.

18. The method of claim 1, wherein determining the test state includes:
    comparing the at least one threshold value against the test element characteristic of selected ones of the test elements to indicate the test state of the selected ones of the test elements.

19. The method of claim 1, further comprising:
    comparing similarities between the test element characteristics of the known-state test elements to provide at least one second comparison criteria for the test elements; and
    assigning a final test state indicated by both the one or more comparison results and the at least one second comparison criteria.

20. The method of claim 19, wherein determining a final test state includes:
determining a final test state for the selected ones of the test elements having an unknown test state.

21. The method of claim 19, wherein determining a final test state includes:
determining a final test state for the all the test elements.

22. The method of claim 1, further comprising:
comparing similarities between the test element characteristics of the known-state test elements to provide at least one second comparison criteria; and
determining a final test state indicated by the at least one second comparison criteria for selected ones of the test elements.

23. The method of claim 22, wherein the at least one second comparison criteria are average intensities of test elements in the same state.

24. The method of claim 22, wherein determining a final test state includes:
comparing the test element characteristics of unknown elements to the at least one second comparison criteria; and
assigning the unknown element the test state indicated by the at least one second comparison criteria to which the test element characteristic is the closest.

25. The method of claim 22,
wherein comparing similarities between the test element characteristics of the known-state test elements to provide at least one second comparison criteria; includes:
comparing similarities between the test element characteristics of the known-state test elements within local neighborhoods so as to provide at least one second comparison criteria.

26. The method of claim 1, wherein determining the test state includes:
assigning at least one test element an unknown state, the method further comprising:
altering the at least one threshold value of the plurality of first comparison criteria so as to provide a second threshold value; and
determining the test state of the test elements having the unknown state using the second threshold value.

27. The method of claim 1, further comprising:
dividing the image into initial sub-images;
calculating gain coefficients for each of the initial sub-images;
fitting a function to the gain coefficients of the initial sub-images; and
normalizing the image using the function before extracting an test element characteristic.

28. The method of claim 1 for inspecting the state of test elements, the test elements having a regular pattern, the method further comprising:
generating a model of model elements arranged in the regular pattern shared by the test elements, each of the model elements having a model state;
associating each of the test elements in the test image with the model state of the model element at a similar location within the regular pattern as the test element; and
inspecting the test elements by comparing the test state with the model state.

29. The method of claim 28, wherein extracting includes:
extracting an test element characteristic of each of the test elements in the test image using the model state.

30. The method of claim 28, wherein extracting further comprises:
weighting portions of the test image at a plurality of positions;
extracting the test element characteristic at one of the plurality of positions that most closely represents the model state of the test element.

31. The method of claim 28, wherein choosing at least one threshold value, includes:
creating a first histogram containing a portion of the plurality of first comparison criteria of neighboring test elements having same model states;
creating a second histogram containing a portion of the plurality of first comparison criteria of neighboring test elements having different model states;
generating a score graph by adding the first histogram and subtracting the second histogram across the plurality of values of the plurality of first comparison criteria; and
choosing the at least one threshold value as the one of the plurality of first comparison criteria having a highest score of the score graph.

32. The method of claim 28, further comprising:
displaying the model to the user for user verification that the model is correct.

33. The method of claim 28, wherein generating a model, includes;
acquiring a model image of the model elements, each of the model elements being in a model state;
extracting an test element characteristic from each of the model elements in the model image;
processing the test element characteristics of the model elements so as to provide at least one comparison criteria;
choosing at least one threshold value of the at least one first comparison criteria; and
determining the model state of selected ones of the model elements in the image using the at least one threshold value.

34. The method of claim 33, further comprising:
generating a match metric of the model to the model image to verify the model is correct.

35. The method of claim 1, wherein the test state is indicates a color of the test elements.

36. An apparatus for determining a state of test elements, the apparatus comprising:
a test image of the test elements, each of the test elements being in a test state;
extracting means for extracting an test element characteristic approximately representing each of the test elements in the test image;
processing means, in cooperation with the extracting means, for processing the plurality of test element characteristics from the test image alone so as to provide a plurality of comparison criteria;
choosing means, in cooperation with the processing means, for choosing at least one threshold value based on at least a subset of the plurality of comparison criteria and comparing the at least one threshold value with at least one of the plurality of the comparison criteria to provide one or more comparison results for each one of the test elements associated with the at least one of the plurality of comparison criteria; and
state means, in cooperation with the choosing means, for determining the test state of selected ones of the test elements in the image using the respective one or more comparison results to provide known-state test elements.

37. The apparatus of claim 36, further comprising:

aligning means, in cooperation with the extracting means, for generally aligning the test elements with image pixels before extracting the test element characteristic.

38. The apparatus of claim 36, for inspecting the state of test elements, wherein the test elements have a regular pattern, the apparatus further comprising:

a model of model elements arranged in the regular pattern, each of the model elements having a model state;

association means for associating each of the test elements in the test image with the model state of the model element at a similar location within the regular pattern as the test element; and inspection means, in cooperation with the state means, for inspecting the test elements by comparing the test state with the model state.

39. The apparatus of claim 36, wherein the test state indicates a color of the test elements.

40. An apparatus for determining a state of test elements, the apparatus comprising:

a test image of the test elements, each of the test elements being in a test state;

an extraction module, adapted to extract an test element characteristic approximately representing each of the test elements in the test image;

a processing module, in cooperation with the extraction module, adapted to process the plurality of test element characteristics from the test image alone so as to provide a plurality of comparison criteria;

a choosing module, in cooperation with the processing module, adapted to choose at least one threshold value based on at least a subset of the plurality of comparison criteria and comparing the at least one threshold value with at least one of the plurality of the comparison criteria to provide one or more comparison results for each one of the test elements associated with the at least one of the plurality of comparison criteria; and a state module, in cooperation with the choosing module, adapted to determine the test state of selected ones of the test elements in the image using the respective one or more comparison results to provide known-state test elements.

41. The apparatus of claim 40, further comprising:

an alignment module, in cooperation with the extraction module, adapted to generally aligning the test elements with image pixels before extracting the test element characteristic.

42. The apparatus of claim 40, for inspecting the state of test elements, wherein the test elements have a regular pattern, the apparatus further comprising:

a model of model elements arranged in the regular pattern, each of the model elements having a model state;

an association module, adapted to associate each of the test elements in the test image with the model state of the model element at a similar location within the regular pattern as the test element; and an inspection module, in cooperation with the state module, adapted to inspect the test elements by comparing the test state with the model state.

43. The apparatus of claim 40, wherein the test state indicates a color of the test elements.

* * * * *